(12) United States Patent
Abzarian et al.

(10) Patent No.: US 8,392,981 B2
(45) Date of Patent: Mar. 5, 2013

(54) SOFTWARE FIREWALL CONTROL

(75) Inventors: David Abzarian, Kirkland, WA (US); Gerardo Diaz Cuellar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1263 days.

(21) Appl. No.: 11/801,298

(22) Filed: May 9, 2007

(65) Prior Publication Data
US 2008/0282335 A1 Nov. 13, 2008

(51) Int. Cl.
*H04L 29/06* (2006.01)

(52) U.S. Cl. .......................................... 726/11; 713/154

(58) Field of Classification Search .................. None
See application file for complete search history.

(56) References Cited

U.S. PATENT DOCUMENTS

| | | | |
|---|---|---|---|
| 6,154,775 A | 11/2000 | Coss et al. | |
| 6,484,261 B1 | 11/2002 | Wiegel | |
| 7,870,297 B1 * | 1/2011 | Linhardt | 709/250 |
| 2002/0016826 A1 | 2/2002 | Johansson et al. | |
| 2003/0167405 A1 * | 9/2003 | Freund et al. | 713/201 |
| 2005/0005165 A1 | 1/2005 | Morgan et al. | |
| 2005/0025687 A1 | 2/2005 | Gomez | |
| 2005/0028416 A1 | 2/2005 | Dundorf | |
| 2006/0074337 A1 | 4/2006 | Yoo | |
| 2006/0088409 A1 | 4/2006 | Bracken et al. | |
| 2007/0016945 A1 | 1/2007 | Bassett et al. | |
| 2007/0022479 A1 | 1/2007 | Sikdar et al. | |
| 2008/0305766 A1 * | 12/2008 | Falk | 455/410 |

FOREIGN PATENT DOCUMENTS

GB 2408407 B2 5/2006

OTHER PUBLICATIONS

Saikat Guha et al., "Architecting a Secure Internet", *SOSP*, Oct. 2005, 12pp.
Kai Hwang et al., "Micro-Firewalls for Dynamic Network Security with Distributed Intrusion Detection", *IEEE*, 2001, pp. 68-79.
Lawrence Teo et al., "Dynamic and Risk-Aware Network Access Management", *SACMAT*, Jun. 2003, pp. 217-230.
"Firewall Policy", *Cisco Router and Security Device Manger*, Version 2.2 User Guide, Chapter 6, pp. 6-1 to 6-18.2005.

* cited by examiner

*Primary Examiner* — Gilberto Barron, Jr.
*Assistant Examiner* — Izunna Okeke

(57) ABSTRACT

A software firewall that may be simply configured using rules specified for types of network interfaces rather than individual network interfaces. The network types may be specified with type identifiers that have a readily understandable meaning to a user, facilitating ease of configuring the firewall. The network types could include, for example, wired, wireless and remote access. A rule specified based on a network type can be translated to firewall filters for network interfaces of that network type. The translation may be performed automatically and may be updated based on network location awareness information.

17 Claims, 5 Drawing Sheets

SOFTWARE FIREWALL CONTROL

BACKGROUND

Computers are widely used in both business and personal settings. Frequently, the utility of a computer is greatly enhanced by its ability to send or access data over a network. Unfortunately, expanding the functionality of a computer by connecting it with devices operated by other legitimate users also creates the risks that the computer will become connected to devices operated by third parties who, either maliciously or inadvertently may send message over the network that cause damage to the computer to the computer or the data that it stores. Alternatively, using the network, a malicious third party may improperly gain access to information stored on the computer that was intended to be secret. In these scenarios, rather than enabling desired functionality, the network connection poses a security risk for a computer and its user.

To combat security risks posed by network connections, firewalls are frequently used. A firewall may be a hardware or software component that filters network traffic so that communications with unauthorized third parties are blocked but legitimate network functions may be carried out. Frequently, the filters applied by a firewall are specified by a set of rules defining characteristics of network messages that either should pass through the firewall or that should be blocked.

SUMMARY OF INVENTION

To facilitate configuring a firewall on a computer with multiple network interfaces, a networked computer may accept firewall rules applicable to all network interfaces of an identified type. The network types may be identified with "friendly" names that relate to network characteristics readily understandable to a user. The networked computer may automatically gather information about its network interfaces to identify network interfaces corresponding to each type of network interface. The networked computer may then use this information to translate rules specified by network type into firewall filters applicable to each network interface.

In some embodiments, a mapping between network type and specific network interfaces belonging to that type may be stored to simplify processing required as firewall rules change. The networked computer may contain components that detect changes in the network configuration. In response to such changes, the networked computer may recompute the mapping between network type and network interfaces and reapply the mapping to previously defined rules.

To enhance the user experience for the user of the networked computer, both the network type to network interface mapping and the mapping between rules and filters for specific network interfaces may be updated without express user interaction.

In one aspect, the invention relates to a method of operating a computing device with at least one network interface and a firewall. The firewall executes at least one filter associated with a network interface to determine whether a network communication passes the firewall. In operation, a rule identifying a type of network is received and translated into filters specified for network interfaces. As a result, a user does not require administrator rights to make such updates and there is no need to expressly request an administrator to make updates. Likewise, the use of "pop-ups" to solicit user input is avoided.

In another aspect, the invention relates to a computing device having a user interface through which user may provide input indicating a network type in conjunction with a firewall rule. The firewall rule is converted to at least one firewall filter for at least one network interface identified based on the selection of the network type.

In another aspect, the invention relates to a computer-readable medium with computer-executable instructions that can be executed to receive a specification of a rule including a network type identifier and translate the rule into at least one filter specified for a network interface of the at least one network interface.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that a user experience for a user of a networked computer may be greatly improved by simplifying a process by which firewall rules may be specified. The process may be simplified by allowing the user to specify rules in terms of network types. "Friendly" names may be used for the network types. For example, a computer user is more likely to understand network types such as "wireless," "Local Area Network" or "remote access" than specific identifiers for network interfaces used by networks of these types. As other examples, network types such as "tunnels" or "non-tunnels" could be defined corresponding IPv4-IPv6 transitioning and encapsulation technologies. However, the specific network types are not a limitation on the invention and any suitable types may be used. By accepting firewall rules specified in terms of these "friendly" network type identifiers, a user may more readily and more accurately specify appropriate firewall rules.

Figure 1:
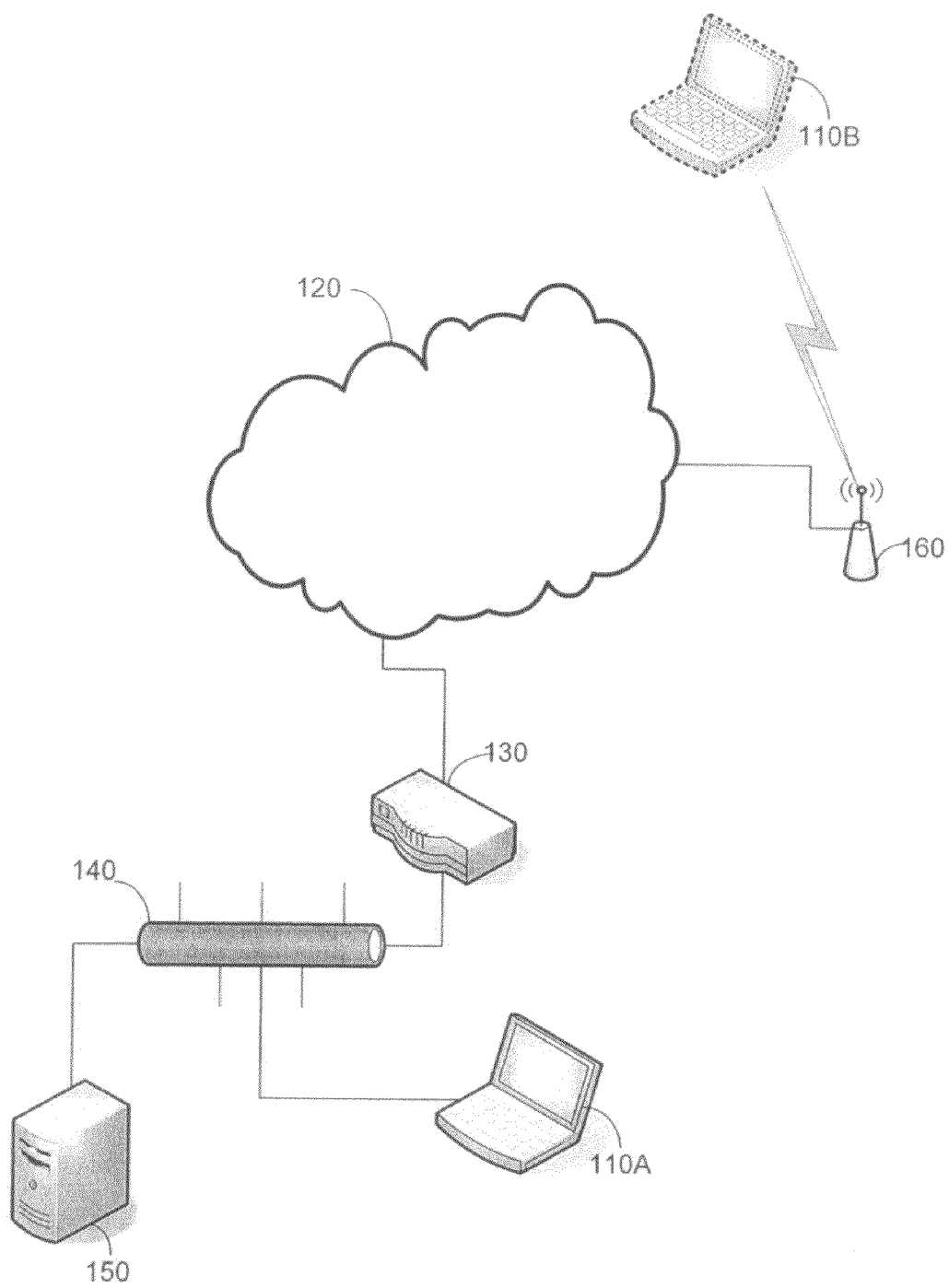
FIG. 1 is a sketch of a prior art network configuration.

The desirability of simplifying configuration of a firewall is illustrated by FIG. 1. FIG. 1 provides an example of an environment in which a networked computer may be deployed. In this example, networked computer 110A is shown connected to a local area network (LAN) 140. Other devices, such as server 150, are also connected to LAN 140. With this configuration, networked computer 110A may exchange information with server 150.

LAN 140 is shown connected to a broader network 120 through router 130. In the embodiment illustrated, network 120 may be the Internet. As shown, the networked computer is a laptop or other portable computing device. Accordingly, from time to time, networked computer 110A may be disconnected from LAN 140.

To provide network connectivity for a portable computing device even when not connected to a wired network, such as LAN 140, many laptops computers contain wireless network interfaces. Accordingly, networked computer 110A may be moved to a position denoted 110B where it may connect to network 120 through a wireless access point 160.

Though the environment illustrated in FIG. 1 is greatly simplified, it illustrates complexity that may be encountered by a computer user in configuring a firewall. LAN 140 may be a relatively secure network, with undesirable network traffic being filtered in router 130, which may also contain a network firewall. Accordingly, if networked computer 110A is configured with an interface to LAN 140, a user of networked computer 110A may desire that all network traffic freely pass through that network interface without being filtered. However, the same computer moved to location 110B and connected to network 120 without an intervening device that filters traffic poses a security risk. Accordingly, a user of network computer 110B may desire a higher level of filtering of messages passed through a network connection formed with access point 160.

As a further complexity, not all messages passing through access point 160 may pose a security risk for networked computer 110B. For example, networked computer 110B may be configured with a virtual private network application or other application that provides secured communications over an insecure network 120. If such a remote access application is provided, any network connection formed by that remote access application, even if it transmits or receives messages through access point 160 should not be filtered.

For the networked computer illustrated in FIG. 1 to perform as desired, different firewall filter rules may be required for each network interface supported by that computer. More lenient rules may be specified for a network interface to LAN 140. More restrictive firewall rules may be provided for a network interface that supports general communication. Less restrictive rules may be provided for a network interface for a secure remote access application that connects through wireless access point 160.

In some prior art systems, different rules are provided for different operating scenarios by allowing a user to specify different rules for each network interface. However, individual users frequently lack the detailed understanding of network interfaces to specify all of the rules necessary to configure a networked computer to perform as desired in each setting. In some instances, users receive assistance from network administrators or other sources. But in other instances, users operate their networked computers with their software firewalls configured improperly or experience frustration establishing appropriate rules.

The inventors have appreciated that if a user could set rules based on "friendly" network types, such as "LAN," "wireless" or "remote access," the user could readily specify rules for typical operating scenarios without detailed special knowledge of networking. Further, a computer that supports such "friendly" network types can readily present a user interface that may further simplify the process of configuring a firewall. Such a configuration process also can be completed without detailed user knowledge of IANA interface types or a need for a user to specify rules for all IANA types.

To support specification of firewall rules in terms of "friendly" network type identifiers, a networked computer may support a mechanism for mapping "friendly" network type identifiers to specific network interfaces. To further enhance the user experience, in some embodiments, the networked computer may automatically update the mapping in response to changes in the network configuration of the networked computer. Thus, an updated mapping may be applied to generate new firewall rules, also without user involvement.

Such a mapping because it reduces the need for applications to update their rules whenever the network configuration changes also simplifies the development and operation applications. For example, an application could provide firewall rules at install time. Thus, there would be no need to update the rules in operation as the network configuration changes, and the application could operate without administrative privileges needed to change firewall rules. Not requiring administrative privileges to operate an application provides a further security advantage because it reduces the chance of an attack using the application.

Figure 2:
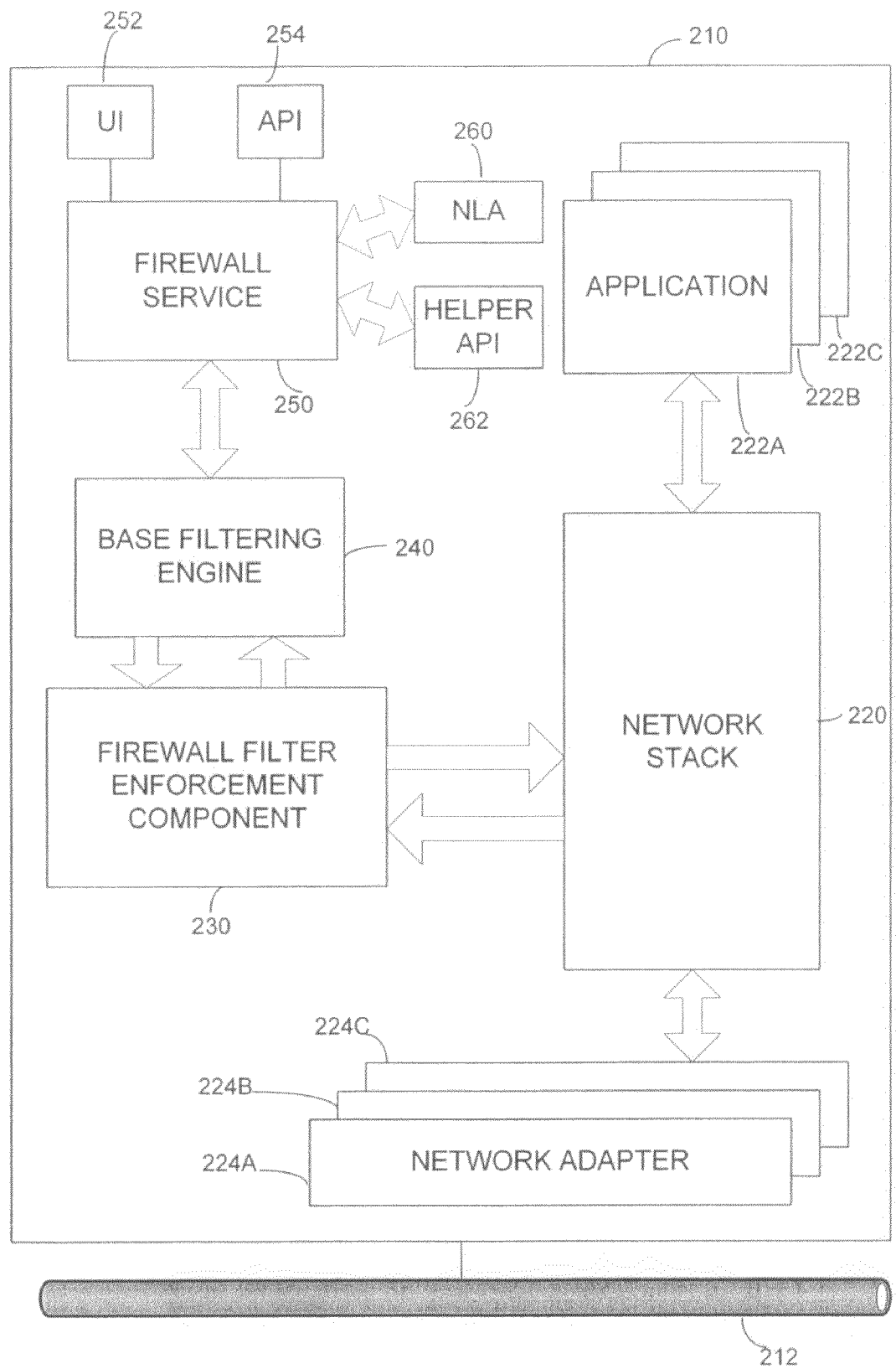
FIG. 2 is an architectural block diagram of a networked computer with a firewall that may be operated according to an embodiment of the invention.

A networked computer with the capability for receiving and applying firewall rules specified based on "friendly" network types may be constructed in any suitable way. In some embodiments, such a networked computer may be constructed using components as are known in the art with modifications in a firewall service to support receipt and processing of firewall rules specified based on "friendly" network type. FIG. 2 illustrates the architecture of such a networked computer.

FIG. 2 is an architectural block diagram of a networked computer 210. Networked computer 210 may be any computer device configured to operate over any one or more networks. In the embodiment illustrated, a wired network 212 is illustrated. However, many networked computers contain multiple network interfaces and, though not expressly shown, may interface to multiple wired and/or wireless networks. Accordingly, the number and type of networks to which a computer is connected is not a limitation on the invention.

Regardless of the specific type of networks to which network computer 210 is connected, it may be configured with one or more software components stored in a suitable computer-readable medium and adapted to process network traffic. Those components may process both incoming and outgoing network traffic and firewall filtering could apply to incoming traffic or outgoing traffic or both. The network traffic may be in any suitable form, which is frequently dictated by the protocol used by the network over which the network traffic is communicated. Frequently, network traffic will be in the form of TCP or UDP packets, but the specific form of the network traffic is not a limitation on the invention and messages in suitable form may be processed according embodiments of the invention.

Network computer 210 may contain one or more components as is known in the art for processing network traffic. Such components may include network stack 220. In the embodiment illustrated, network traffic passes through network stack 220. Network stack 220 may be a network stack as is known in the art. However, any suitable network stack may be used.

Network stack 220 receives outgoing messages from applications 222A, 222B and 222C. Here, three applications are shown for simplicity, but networked computer 210 may contain any number or type of applications.

Network stack 220 interfaces with network adapters 224A, 224B and 224C. Each of the network adapters 224A . . . 224C provides an interface for a specific network, though more than one adapter may be provided to interface to the same network. Though three network adapters are illustrated in FIG. 2, any number or type of network adapters may be used within networked computer 210. Each of the network adapters 224A . . . 224C may have operating characteristics to support a specific form of network communication and may be implemented as is known in the art or in any other suitable way.

To provide security, network computer 210 is configured with a software firewall. The software firewall also may contain components as are known in the art. However, components of the software firewall may be implemented in any suitable way.

In the embodiment illustrated, the software firewall contains a firewall filter enforcement component 230, which may operate to filter network traffic using mechanisms as are known in the art. In the embodiment illustrated, firewall filter enforcement component 230 maintains a set of filters specifying, for each network adapter 224A . . . 224C, network traffic that should be passed or blocked. Firewall filter enforcement component 230 interfaces with network stack 220 to apply these filters to traffic passing through stack 220. As network stack 220 processes network messages, it interacts with firewall filter enforcement component 230 to determine whether each message should be passed or blocked.

In the embodiment illustrated, network stack 220 and firewall filter enforcement component 230 may be contained within the kernel of an operating system for network computer 210. The filters used by filter enforcement component 230 may be provided from the user mode portions of the operating system. The filters may be derived from user input or may be derived from execution of scripts or other program elements or otherwise derived in any other suitable way. Regardless of how filters are derived, the firewall filters may be provided to firewall filter enforcement component 230 via a user mode component. In the embodiment illustrated, base filtering engine 240 provides those filters to firewall filter enforcement component 230. Base filtering engine 240 may be a base filtering engine as in a conventional firewall. However, base filtering engine 240 may be implemented in any suitable way.

In the embodiment illustrated, base filtering engine 240 receives information defining firewall filters from firewall service 250. As in a firewall service in some known network computers, firewall service 250 may provide one or more interfaces through which firewall rules may be specified. In the embodiment illustrated, user interface 252 and application programming interface 254 illustrate interfaces through which firewall rules may be specified.

To operate as desired, firewall service 250 may interface with a network location awareness component 260. Network location awareness component 260 may provide information about the network interfaces maintained by network computer 210. Network location awareness component 260 may be implemented using mechanisms as are known in the art and may output for each network interface information about the network that can be accessed through that interface. Additionally, network location awareness component 260 may monitor interfaces established or broken-down and output an indication when the network configuration of networked computer 210 changes. Such an indication may be used by firewall service 250 as a trigger to update firewall filters or information used to implement firewall filtering that depends on the network configuration of network computer 210.

Additional information about network interfaces may be obtained through helper API 262. Helper API 262 may be a component as is known in the art, though any suitable implementation may be used. Helper API 262 may be a component configured to interface with network adapters 224A . . . 224C installed in networked computer 210. Through the interface provided by helper API 262, firewall service 250 may obtain additional information about each network interface.

Firewall service 250 may be implemented using technology for implementing a firewall service as is known in the art. However, in the embodiment illustrated, firewall service 250 is configured to receive input specifying firewall rules based on network type instead of or in addition to rules that specify firewall filtering for individual network interfaces. The specific network types supported by firewall service 250 is not critical to the invention. However, as one example, firewall service 250 may support a set of network types that includes "wireless," "LAN," "remote access" or "all."

Firewall rules specified based on network types may otherwise define firewall operation as in prior art firewall rules, though any suitable representation of a rule may be used. For example, as in some prior art firewalls, each rule may specify one or more protocols in which the rule is active. Likewise, the rule may specify one or more profiles in which the rule is active Also, the rule may specify an action to be performed by the firewall when the rule is triggered. For example, a rule may specify either that message traffic should be blocked or allowed. Other portions of the rule may specify other operating characteristics of the firewall. For example, a rule may specify a state for the rule, such as enabled or disabled. Additionally, rules may be assigned names or other identifiers that allow the rule to be accessed for editing after it is created. All of these characteristic may be specified using mechanisms as known in the art or in any other suitable way.

Regardless of the form in which network type rules are specified, each of the rules may be translated into a format that may be processed by other firewall components. In the embodiment illustrated, firewall components adapted to apply firewall rules specified based on network interfaces are used. Accordingly, the rules specified based on a network type may be translated into one or more rules specifying firewall action based on network interfaces.

Firewall service 250 may convert firewall rules specified for one or more network types to one or more rules applicable to interfaces of the specified network type. Once converted to rules for specific network interfaces, the rules may be passed to base filtering engine 240 where they may be processed as in known firewalls or in any other suitable way.

Figure 3:
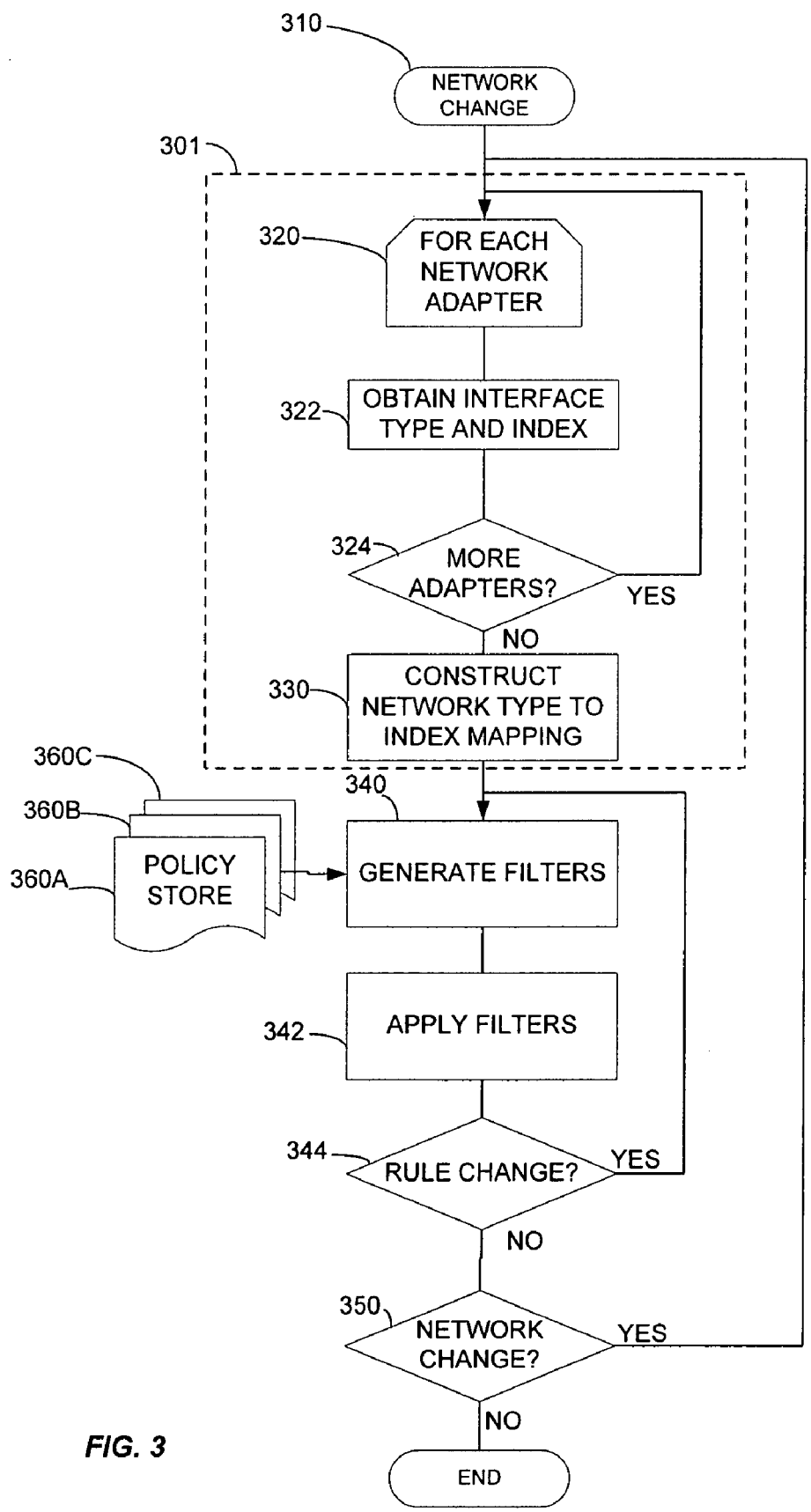
FIG. 3 is a flow chart of a process of programming firewall filters according to an embodiment of the invention.

FIG. 3 illustrates a process by which a networked computer configured according to an embodiment of the invention may operate. The process of FIG. 3 begins at start point 310. The process illustrated in FIG. 3 may be initiated in response to any suitable triggering event. In the embodiment illustrated, the process begins when a network change is detected, which may be the initial configuration of a network computer for connection to a network or any subsequent changes to any network connection.

Any suitable mechanism may be used to detect a network change. In the embodiment illustrated in FIG. 2, network computer 210 includes network location awareness component 260 that monitors network interfaces formed by computer 210. Network location awareness component 260 may output an indication of a change in any network interface. In response to an indication of a network change, subprocess 301 is initiated to construct a mapping between network types that may be used to specify firewall rules and specific network interfaces maintained by computer 210.

Subprocess 301 begins at loop start 320. Loop start 320 is the start of a processing loop that is performed for each network adapter installed in computer 210. In some prior art networked computer, the operating system maintains information about each installed network adapter in a format that may be accessed by other operating system services, such as firewall service 250. However, any suitable mechanism may be used to identify the installed network adapters in a computer in which the process of FIG. 3 is performed.

Regardless of how the installed network adapters are identified, processing proceeds to block 322. At block 322, for the selected network adapter, information is obtained about the network interface supported by that adapter. In the embodiment illustrated, the information obtained includes an interface type and index. The information obtained at block 322 may be in any suitable form. For example, interface type information may be a parameter defined according to a known standard. As a specific example, the Internet Assigned Numbers Authority (IANA) has developed a catalog of interface types. Most network adapters are classified according to one of these IANA types. Accordingly, processing at block 322 may obtain from a network adapter the IANA type of the interface supported by that network adapter.

The index obtained by processing at block 322 is an example of information that may be used to identify a network interface supported by the network adapter. In the embodiment illustrated, the information identifying the interface is in a form that allows communication between firewall filter enforcement component 230 and network stack 220. In some prior art networked computers, specific interfaces are identified by a Locally Unique Identifier (LUID), which may be assigned to each interface as it is formed. The LUIDs may be assigned sequentially, randomly or in any other suitable form. In some embodiments, the locally unique identifier may be a 64 bit number, but the specific form of the LUID is not critical to the invention and any suitable form that uniquely identifies an interface within the networked computer may be used. Regardless of how the LUID is assigned, it may serve as an index for identifying a specific interface and may also be obtained from a network adapter for the interface.

After information is obtained at block 322, the process continues to decision block 324. At decision block 324 the process branches depending on whether further network adapters remain for processing. If further network adapters remain, subprocess 301 loops back to loop start 320 where the processing at block 322 and decision block 324 is repeated for the next network adapter.

Conversely, when all installed network adapters have been processed, processing proceeds to block 330. At block 330, a mapping is constructed to map "friendly" network types to specific network indexes. Such a mapping is useful in translating rules specified based on network type to rules that are enforced for individual network interfaces.

Figure 5:
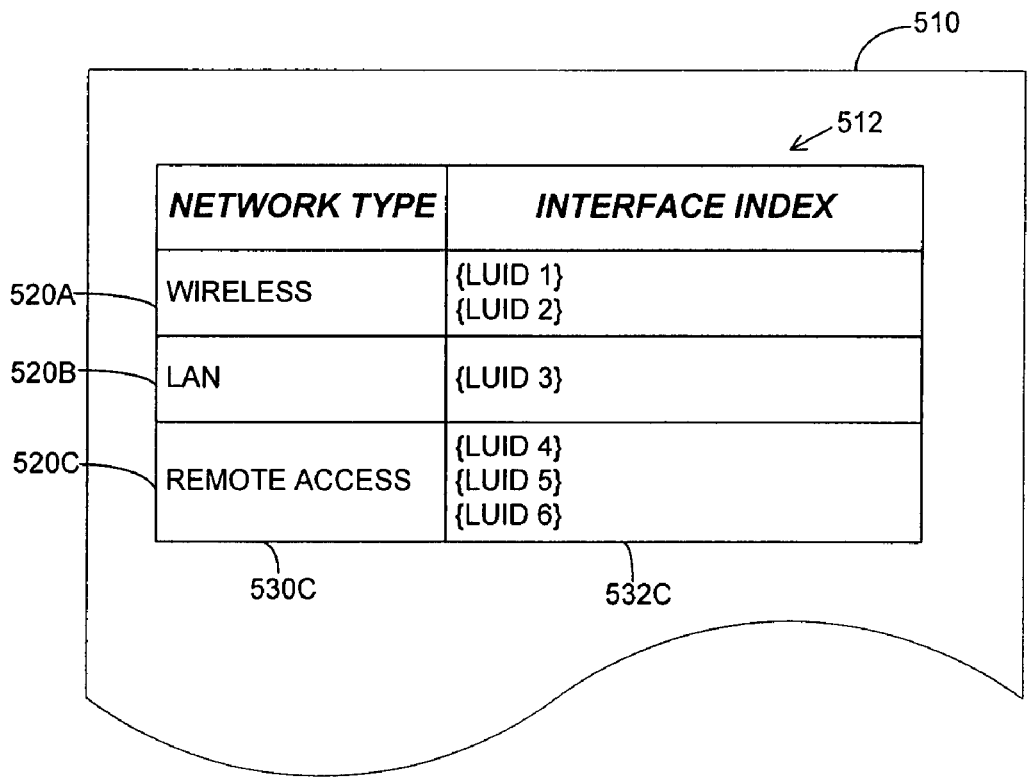
FIG. 5 is a sketch of a data structure according to an embodiment of the invention.

The mapping created at block 330 may be stored in a data structure or otherwise retained in any other suitable fashion for use in translating rules specified by network type into firewall filters. FIG. 5 provides an example of a data structure storing such a mapping. In the embodiment of FIG. 5, a data structure is shown stored in computer readable media 510. Computer readable media 510 may be any suitable media associated with computer 210 (FIG. 2). Data structure 512 may store information in any suitable form that is useful for performing a mapping between network type and specific network interfaces.

In the embodiment illustrated in FIG. 5, data structure 512 is organized with multiple rows. Here, three rows 520A, 520B and 520C are illustrated. In the embodiment of FIG. 5, each row corresponds to one network type. Accordingly, the embodiment of a data structure illustrated in FIG. 5 corresponds to an embodiment in which three network types have been defined. In the specific example of FIG. 5, those network types are "wireless," "LAN," "remote access." However, the invention is not limited to the specific network types illustrated or to three network types.

Regardless of the specific number or network types defined, each row 520A, 520B or 520C maps a network type to applicable network interfaces of that type. Taking row 520C as illustrative, the row contains a field 530C storing a value identifying a network type. In FIG. 5, field 530C stores a value "remote access."

Row 520C also includes a field 532C, containing information defining network interfaces that are of the type specified by the value in field 530C. In the embodiment illustrated, field 532C may store multiple values, each identifying a network interface. In the embodiment illustrated, network interfaces are identified by indexes which are stored in field 532C. In FIG. 5, three network interface indexes "LUID 4," "LUID 5" and "LUID 6" are shown in field 532C.

In the example of FIG. 5, row 520C shows a mapping between one network type, "remote access," and three network interface indexes, "LUID 4," "LUID 5" and "LUID 6." However, the number of network interface indexes associated with each network type is not a limitation on the invention. For example, row 520A shows a mapping between one network type and two network interface indexes. Row 520B shows a mapping between one network type and one network interface index. However, zero or more network interface indexes may be mapped to each network interface type, with the specific number depending on the network configuration of computer 210.

In constructing a network type to index mapping at block 330, information about the interface types that correspond to each network type may be employed in conjunction with information obtained at block 322 about the interface types of network interfaces established on computer 210. This information may be processed in any suitable way to construct the data structure 512. However, in the embodiment illustrated, a schema is defined mapping IANA interface types to network types. With this schema, a network type may be associated with each network interface. The LUID of the network interface may therefore be associated with a specific network type, thereby creating a data structure in the form of data structure 512 (FIG. 5).

Figure 4:
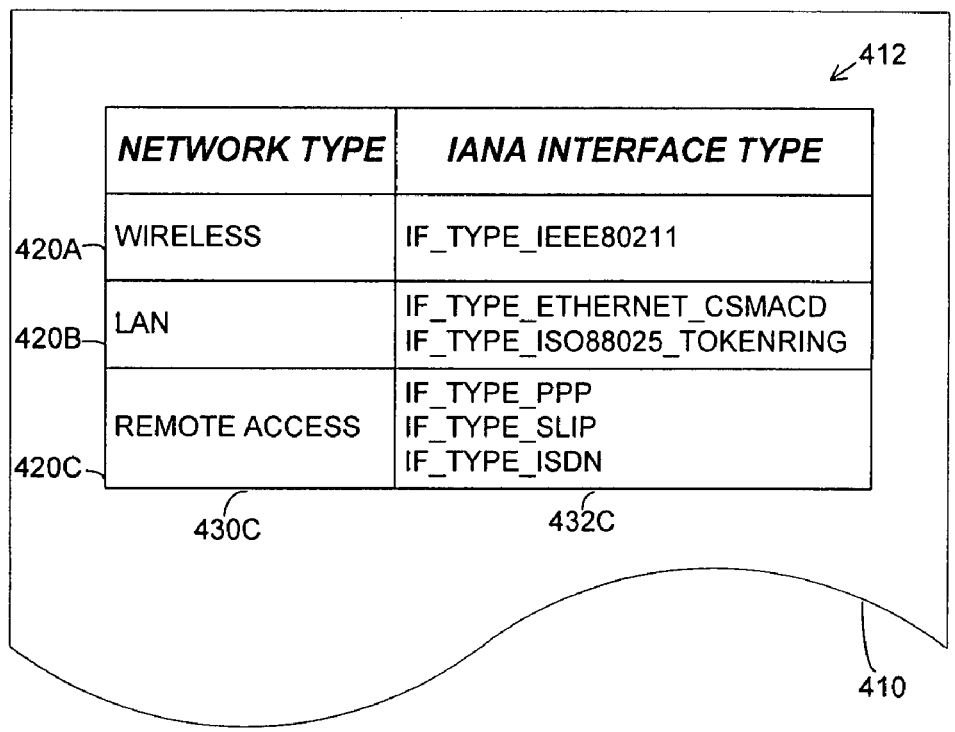
FIG. 4 is a sketch of a data structure according to an embodiment of the invention.

FIG. 4 illustrates a schema 412 that may be used for mapping interface types to network types such as may occur at block 330 (FIG. 3) to create date structure 512 (FIG. 5). In the embodiment illustrated, schema 412 is implemented as a data structure in computer readable media 410. Schema 412 may be a fixed schema, provided as a component of a firewall for computer 210, though in some embodiments, schema 412 may be programmable. Computer readable media 410 may be any suitable computer readable media associated with networked computer 210 (FIG. 2).

The specific structure and storage of schema 412 is not critical to the invention. However, in the embodiment of FIG. 4, each network type is shown in a row, such as row 420A, 420B and 420C. Each row also contains information identifying the interface types associated with a network type. For example, row 420C provides a mapping between a network type of "remote access" and three IANA interface types. The network type is identified in the value in field 430C. The IANA interface types are identified by values in field 432C. In the embodiment illustrated, IANA interface types are "IF_TYPE_PPP," "IF_TYPE_SLIP" and "IF_TYPE_ISDN." The inventors have appreciated that network interfaces having one of those IANA interface types is indicative of a network interface used to provide remote access, such as through a Virtual Private Network (VPN).

Other IANA interface types can be associated with other network types likely to be useful and recognizable to a user. For example, row 420B indicates that interfaces having an IANA interface type of "IF_TYPE_ETHERNET_CS-MACD" or "IF_TYPE_ISO88025_TOKENRING" are characteristic of a local area network. Similarly, row 420A indicates that a network interface with IANA interface type of "IF_TYPE_IEEE80211" is characteristic of a wireless network. By forming a schema, such as schema 412 that maps IANA interface types to "friendly" network types, a networked computer may be readily configured with firewall rules that define operation of the firewall for network types that are readily understood by a user.

Once a mapping as reflected in data structure 512 is constructed, the process of FIG. 3 proceeds from block 330 to block 340. At block 340, the mapping captured in data structure 512 (FIG. 5) may be used to generate one or more firewall filters based on firewall rules that have been specified based on "friendly" network types.

In the embodiment of FIG. 5, firewall rules are stored in one or more policy stores, of which three policy stores 360A, 360B and 360C are illustrated. However, any suitable number of policy stores may be used to hold firewall rules. In the embodiment illustrated, different policy stores may be used to contain rules applicable in different operating contexts of computer 210. For example, computer 210 may be configured to operate as part of a managed domain. In such an embodiment, one of the policy stores 360A . . . 360C may contain policy information, such as firewall rules, set by an administrator of the managed domain. Computer 210 also may be capable of operation according to policies set by a user. Accordingly, one of the policy stores 360A . . . 360C may store policy information, including firewall rules, set by a user. Another one of the policy stores 360A . . . 360C may contain policy information, including firewall rules, that is obtained dynamically and stored for use for a limited period of time.

Each policy store may contain policy information according to one or more profiles. Each profile may be applicable in a specific network environment in which network computer 210 is connected. For example, each policy store 360A, 360B, 360C may contain a domain network profile, a private network profile and a public network profile. The domain network profile may contain policy information applicable when the networked computer is joined to a managed domain. The private network profile may contain policy information applicable when the networked computer is connected to a private network but is not domain joined. The public network profile may contain policy information applicable when the networked computer is connected to a public network, such as directly to the Internet through an access point.

The policy stores 360A . . . 360C illustrated in FIG. 3 provide one example of the organization of policy information applicable to configuring a firewall. Any number or type of policy stores may be employed and any one of the policy stores may be selected at any time in any suitable manner as a source for firewall rules. More generally, firewall rules may be obtained from any suitable source.

Regardless of the number and type of policy stores and the number and types of profiles associated with each policy store, policy stores 360A . . . 360C may provide a set of firewall rules in any given networking context. Some or all of the firewall rules in the policy stores 360A . . . 360C may be defined based on a network type to which they are applicable. At block 340, these rules may be translated into network filters using the network type to index mapping constructed at block 330.

Processing at block 340 may be performed in any suitable way. For example, each of the applicable rules in policy stores 360A . . . 360C that is specified based on a network type may be translated into a set of rules, with one rule for each network interface of the network type defined in the rule. By expanding one rule based on network type into one or more rules based on network interfaces, the resulting rules may be in the form used in a prior art firewall. Once rules specified based on network type are translated into rules specified by network interface, the rules may thereafter be translated to firewall filters using a mechanism as known in the art or in any other suitable way.

Accordingly, once filters are generated at block 340 they may be applied at block 342. Processing at block 342 may be performed as in software firewalls as is known in the art, such as by providing the filters to an enforcement component. However, the specific mechanism by which firewall filters are applied is not a limitation on the invention and any suitable mechanism may be employed. Once the filters generated at block 340 are applied at block 342, the firewall within network computer 210 may operate to selectively block or allow message traffic based on the applicable firewall rules in the applicable policy stores 360A . . . 360C.

A networked computer with a software firewall configured with filters derived according to the process of FIG. 3 may continue to operate, blocking or allowing network traffic selectively based on the firewall rules. The networked computer may continue to operate using these filters until an event occurs requiring a change in the filters. One event that may require a change in the filters is a change in one or more of the applicable rules.

Accordingly, FIG. 3 illustrates that in the event of a rule change, the process branches from decision block 344 to block 340. Processing at decision block 344 may detect a rule change in any suitable way. For example, a firewall service 250 (FIG. 2) may receive one or more rules through user interface 252 or programming interface 254. In response to receiving additional rules, firewall service 250 may control the process illustrated in FIG. 3 to loop back to block 340.

Regardless of how a rule change is detected, when the process loops back to block 340, filters for the firewall may be regenerated using the changed rules. The filters generated with the changed rules may then be applied at block 342 after which the firewall may continue to operate, selectively blocking or allowing network traffic based on the changed rules. In this scenario, processing at block 340 may use the mapping previously created and stored at block 330. Reusing a previously stored mapping in scenarios in which the mapping has not changed may improve the overall performance of a networked computer.

Another event that may trigger a change in filters employed by a software firewall is a change in the network configuration of computer 210. For example, computer 210 may connect to an additional network. Such a change in the network configuration may be detected in any suitable way. In the embodiment illustrated, network location awareness component 260 monitors network connections and notifies firewall service 250 upon detecting any change in network configuration of computer 210. However, any suitable mechanism may be used to detect changes in configuration.

Regardless of how a change in network configuration is detected, upon detection of such a change, the process of FIG. 3 loops back to loop start 320. Subprocess 301 for constructing a network type to network interface mapping may then be repeated. Accordingly, when subprocess 301 is completed, a new data structure in the form of data structure 512 (FIG. 5) is created, reflecting the changes in network configuration. The process of translating applicable rules from policy stores 360A . . . 360C into firewall filters may the be repeated at block 340. The generated filters may be applied at block 342 and the firewall may continue operation, selectively blocking or allowing message traffic based on the specified firewall rules as applicable based on the changed network configuration.

In the embodiment of FIG. 3, changes in network configuration may result in a different set of firewall filters being used. Those filters may be derived from rules previously defined based on network type. Accordingly, those filters may be generated without express user interaction, even if the user did not program rules directly applicable to a new network interface. For example, if a user programs a rule for all wireless networks, when computer 210 connects to a wireless network, filters for that network interface bay be automatically applied. In this way, allowing a user to specify firewall rules based on network type simplifies both the initial specification of the rule and maintaining rules as the network configuration of a networked computer changes. Further, specifying rules based on network types simplifies applications or other programs because it avoids the need for those programs to change rules based on changes in network configuration. It also avoids the need for providing those programs with administrator rights, which further improves security of a networked computer.

Figure 6:
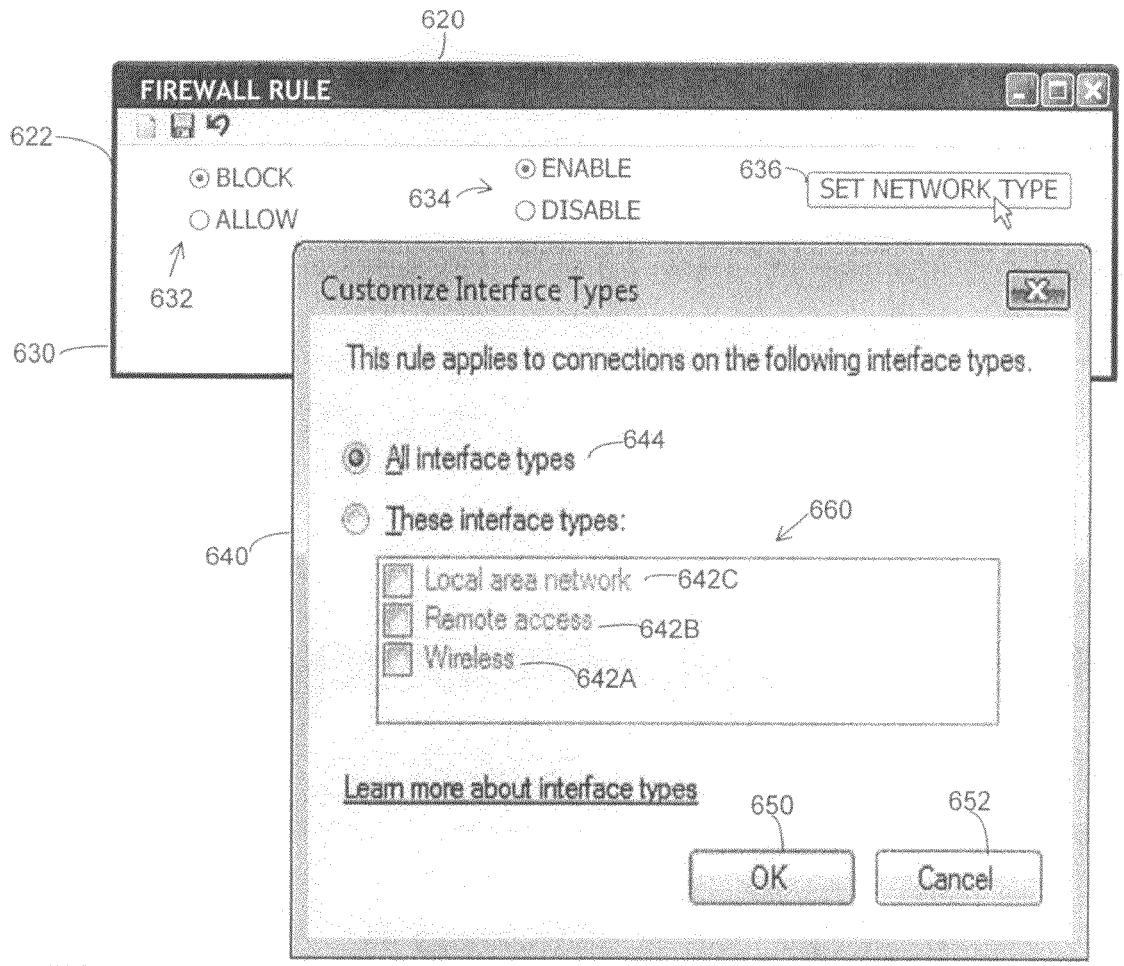
FIG. 6 is a sketch of a graphical user interface for programming a firewall rule according to an embodiment of the invention.

The rules in policy stores 360A . . . 360C may be obtained in any suitable way. As one example, a user may provide firewall rules through a user interface. As an example, FIG. 6 illustrates a graphical user interface through which a user may edit or define a firewall rule. The user interface illustrated in FIG. 6 includes window 620 that provides an input area 630 through which a user may provide input specifying parameters of a firewall rule. Input area 630 may contain one or more control objects that allow a user to easily select values for parameters defining the firewall rule. For example, control objects 632 are illustrated as radio buttons, allowing a user to define an action that is performed by the firewall when the rule is applicable. In the example illustrated, control objects 632 allow a user to indicate whether the message traffic subject to the rule is blocked or allowed.

Input area 630 may also include other control objects, such as control objects 634, which allow a user to specify whether the rule is enabled or disabled. Other control objects, though not expressly shown in FIG. 6, may allow a user to specify values for other parameters, such as a protocol or profile in which the rule is applicable. Additionally, window 620 may contain fields or other objects through which a user may input other information defining the rule. For example, window 620 may provide a mechanism for a user to input a name or other identifying information for the rule.

Window 620 may also contain control objects that allow a user to administer the rule. In the embodiment illustrated, window 620 includes toolbar 622. Toolbar 622 may contain one or more tools, such as tools that allow a user to create a new rule or save a rule that has been defined.

Window 620 may also include a mechanism that enables a user to associate a network type with a rule being defined. In the embodiment illustrated, input area 630 includes a control object 636. Upon selection of control object 636 by a user, dialog box 640 may be presented to the user. In the embodiment illustrated, dialog box 640 provides a mechanism through which a user may associate one or more network types with a rule.

Dialog box 640 includes an input area 660 through which a user may specify one or more network types applicable to the rule being defined in window 620. In the embodiment illustrated, the user is presented with an enumerated list of network types in input area 660. In the example of FIG. 6, the enumerated network types correspond to those contained in the network type to interface type mapping shown in FIG. 4. However, the number and kinds of networks recognized by a networked computer, and therefore the number and kinds of network types presented in input area 660, is not a limitation on the invention and the enumerated list presented in input area 660 may contain any number of entries. Further, it is not a requirement that the number or kinds of networks identified be static. For example, one or more interfaces could be provided to allow specification of network types and associated interface types. Such a feature could be supported, for example, with a tool that expands the data structure storing schema 412 in response to input from a user, a program or other suitable source.

Regardless of the number and kinds of networks depicted in input area 660, a user may select one or more of the network types using control objects such as control objects 642A, 642B or 642C. In the embodiment illustrated, control objects 642A . . . 642C are check box control objects, allowing a user to specify one or more network types applicable to a rule being defined.

Additionally, dialog box 640 contains radio button control object 644. Radio button control object 644 allows a user to specify that a rule is applicable to all network types.

Other control objects in dialog box 640 may allow a user to perform other actions associated with specifying a network type applicable to a rule. For example, button 650, when selected, records the information input through dialog box 640. Conversely, button 652 cancels the input provided through dialog box 640 and returns the user to window 620.

Figure 7:
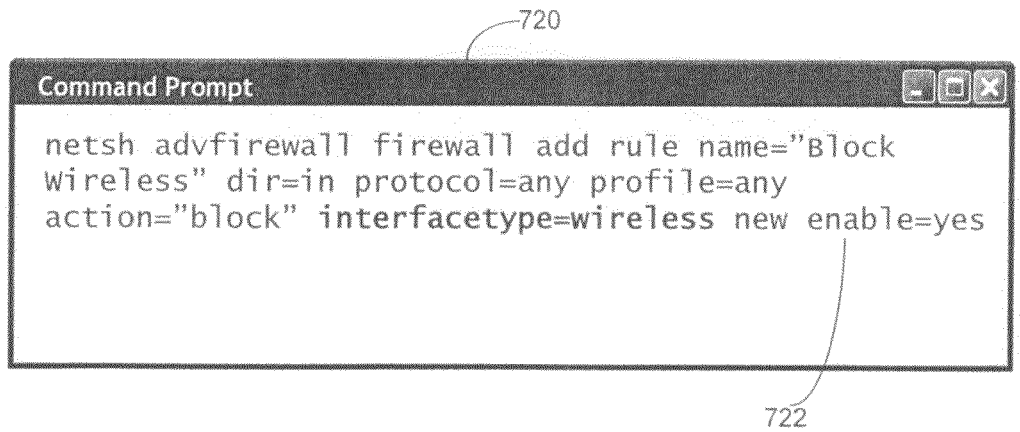
FIG. 7 is a sketch of an alternative embodiment of a user interface for programming a firewall rule according to an embodiment of the invention.

The graphical user interface of FIG. 6 represents just one example of an interface through which a user may specify a firewall rule with an associated network type or types applicable for that rule. FIG. 7 provides an example of an alternative interface, here shown as a command line prompt.

The interface in FIG. 7 includes a window 720, containing an input area 722. A user may specify a rule by typing text into input area 722. Any suitable syntax may be used for entering rule information. In the embodiment illustrated in FIG. 7, the rule is specified with a syntax that contains command key words, indicating that the text input into input area 722 defines a firewall rule. For example, input area 722 is shown with key words "ADVFIREWALL FIREWALL ADD RULE." In addition, the syntax allows one or more parameters to be associated with the command for adding a new rule. In the example of FIG. 7, each parameter is preceded by a parameter type and the "=" sign. As can be seen in the example of FIG. 7 a syntax for defining a rule through a command line prompt may allow specification of one or more parameters of the rule, one of which may be a network type. FIG. 7 shows a parameter called "interface type." That parameter is assigned a value of "wireless," indicating the rule defined in input area 722 applies to all network interfaces identified as being wireless interfaces.

FIGS. 6 and 7 provide two examples of a mechanism through which firewall rules may be specified. Regardless of the form of the interface, a software component may translate user input into one or more rules. For example, a user interface component associated with the graphical user interface of FIG. 6 may modify one or more of the policy stores 360A . . . 360C based on user input provided through the graphical user interface of FIG. 6. Likewise, a component that executes in response to a command entered through the command prompt illustrated in FIG. 7 may modify one or more of the policy stores 360A . . . 360C to reflect user input.

Firewall rules may also be provided in other ways. For example, rather than entering text defining commands that configure firewall rules as shown in FIG. 7, the same or similar text may be stored as part of a script that may be executed to configure firewall rules. The script may be associated with an application, or otherwise provided on networked computer 210. Alternatively, firewall rules may be downloaded to a policy store 360A . . . 360C as part of the download of policy information that sometimes occurs in a domain joined computer. Many computers contain services that access policy servers and periodically download policy information. Firewall rules may be downloaded in the same way that other policy information is downloaded. For example, a policy client executing on networked computer 210 may download firewall rules from a policy server directly to a policy store 360A . . . 360C. The firewall rules downloaded as part of group policy information may contain firewall rules specified based on network type or specified in any other suitable way.

While a graphical user interface, such as is illustrated in FIG. 6, may provide a useful way for specifying firewall rules for a less experienced computer user, scripting may provide a desirable mechanism for specifying firewall rules to an experienced programmer. To facilitate programmatic specification of rules based on network type, application programming interface 254 (FIG. 2) may expose the ability to set or retrieve information about network types associated with specific rules. Commands may be exposed to application developers through a Public COM API to firewall service 250 set as an interface INetFwRule::InterfaceTypes:

```
HRESULT put_InterfaceTypes( BSTR interfaces );
HRESULT get_InterfaceTypes( BSTR* interfaces );
```

The put_InterfaceTypes method may accept a comma delimited string (BSTR) of "friendly" network interface types. The get_InterfaceTypes method returns a comma delimited string (BSTR) of "friendly" network interface types. These types are specified as "RemoteAccess," "Wireless," "LAN" and "All."

Also, a rule schema for firewall rules may differ from known schema to accommodate "friendly" types. For example, a new schema parameter 'IFType' that uses types as defined above could be included. The type "ALL" could be expressly included in a set of values that IFType may have. However, in the embodiment illustrated, the type "ALL" is represented by an absence of any other type value specified as a restriction. 'IFType' may handle only one interface type per specification in the schema, but can be specified multiple times. The specification of "All" interfaces may be accomplished by omitting the parameter completely from the schema. An example of a rule specified with this schema is as follows:

```
Action=Block |Active=TRUE|Dir=In |IFType=Wireless
|IFType=RemoteAccess| Name=Rule1| Desc= new| Edge=FALSE
```

Having thus described several aspects of at least one embodiment of this invention, it is to be appreciated that various alterations, modifications, and improvements will readily occur to those skilled in the art.

For example, a specific set of IANA interface types was used to illustrate the invention. IANA similarly defines tunnel types with associated indicies that may characterize network interfaces. Tunnel type may alternatively or additionally be used to create a mapping between "friendly" network types and IANA interface types.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device with at least one network interface and a firewall, the firewall executing at least one filter, each filter being associated with a network interface of the at least one network interface, and each filter, when executed, determining whether a network communication passes the firewall, the method comprising:
   receiving a network-specific rule, the network-specific rule identifying a type of network to which the network-specific rule is applicable;
   storing a mapping, the mapping indicating network types associated with the network interfaces, wherein a given network type maps to multiple corresponding network interfaces of the given network type;
   translating the network-specific rule to interface-specific rules by identifying, according to the mapping and the network type identified by the network-specific rule, any of the network interfaces that have the network type, and for each of multiple identified network interfaces generating an interface-specific rule corresponding to the interface-specific rule; and
   translating the interface-specific rules to respective filters to be executed by the firewall.

2. The method of claim 1, further comprising:
   receiving an indication of a change of network configuration of the computing device; and
   repeating the act of translating the interface-specific rules for the changed network configuration.

3. The method of claim 1, wherein the network types of the mapping comprise a wired network type, a wireless network type, a network for remote access.

4. The method of claim 1, wherein receiving the network-specific rule comprises receiving a specification of a rule through a programming interface.

5. The method of claim 1, further comprising obtaining interface information associated with each of the network interfaces from each of a plurality of network adapters associated with the network interfaces; and wherein identifying the network interfaces is based on the interface information.

6. In a computing device having a plurality of network interfaces, a user interface including a display, and a user input device, a method of configuring a firewall, the method comprising:
   receiving an input from the user input device indicating a network type in conjunction with a firewall rule, the network type being identified by an identifier that allows display of characteristics of the network to the user;
   according to information indicating which network interfaces are associated with which corresponding network types, wherein at least a given network type is associated with multiple network interfaces, identifying network interfaces of the computing device that are associated with the indicated network type; and
   for each of the identified network interfaces, converting the firewall rule to a corresponding interface-specific firewall filter to be executed by the firewall, each interface-specific firewall filter implementing the firewall rule for a corresponding one of the identified network interfaces.

7. The method of claim 6, wherein the user interface comprises a command line interface.

8. The method of claim 7, wherein receiving an input comprises receiving text characters defining a rule and an argument identifying the network type.

9. The method of claim 6, wherein the user interface comprises a graphical user interface and the method further comprises:
   displaying on the display a plurality of network types in conjunction with an input area adapted to receive a specification of a firewall rule.

10. The method of claim 9, wherein the graphical user interface comprises a plurality of control objects, each control object being associated with a network type of the plurality of network types.

11. A computer-readable storage medium, wherein the computer-readable storage medium is not a signal, the computer-readable storage medium comprising computer-executable instructions, that when executed, perform a method comprising:

receiving a specification of a rule, the rule comprising a network type identifier, wherein the rule is not specific to any network interface;

storing a data structure comprising associations between network type identifiers and network interfaces, the plurality of network types including the network type identifier, the associations indicating which of the network interfaces are associated with which of the network type identifiers, wherein according to the data structure a given network type identifier is associated with multiple corresponding network interfaces;

according to the associations and the network type identifier, identifying network interfaces that are associated with the network type identifier; and for each of the identified network interfaces, translating the rule into a corresponding filter, each filter implementing the rule for a corresponding one of the identified network interfaces.

12. The computer-readable storage medium of claim 11, further comprising a data structure comprising a plurality of records, each record comprising:

a network type field storing a value identifying a network type; and a network interface field storing at least one value representing a network interface of a network type identified by the value in the network type field.

13. The computer-readable storage medium of claim 12, wherein the computer-executable instructions for translating the rule into at least one filter specified for at least one network interface comprise computer-executable instructions for:

selecting a record in the data structure having a network type value matching the network type identifier; and generating a firewall filter for each of the network interfaces identified by a value in the network interface field of the selected record.

14. The computer-readable storage medium of claim 12, wherein the computer-executable instructions for translating the rule into at least one filter specified for at least one network interface comprise computer-executable instructions for:

detecting changes in the network connectivity of a computing device executing the computer-executable instructions; and altering the data values in the data structure in response to detecting changes in the network connectivity.

15. The computer-readable storage medium of claim 12, further comprising a second data structure comprising at least one record, each of the at least one records comprising:

a network type field storing a network type value identifying a network type; and an interface type field storing at least one interface type value identifying at least one interface type that are of the network type identified by the network type value.

16. The computer-readable storage medium of claim 15, further comprising computer-executable instructions for:

accessing information on at least one network interfaces of a computing device executing the computer-executable instructions; and storing the data structure using the second data structure and the accessed information on the at least one network interface field in at least one record of the data structure.

17. The computer-readable storage medium of claim 16, wherein the at least one interface type value comprises a value identifying an IANA interface type.

* * * * *